;# (12) United States Patent
Marumoto et al.

(10) Patent No.: US 8,777,351 B2
(45) Date of Patent: Jul. 15, 2014

(54) PRINT DATA GENERATION APPARATUS AND PRINT DATA GENERATION METHOD

(75) Inventors: Yoshitomo Marumoto, Kawasaki (JP); Hitoshi Tsuboi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 163 days.

(21) Appl. No.: 13/360,462

(22) Filed: Jan. 27, 2012

(65) Prior Publication Data

US 2012/0200625 A1    Aug. 9, 2012

(30) Foreign Application Priority Data

Feb. 4, 2011    (JP) .................... 2011-023254

(51) Int. Cl.
*B41J 29/38* (2006.01)
(52) U.S. Cl.
USPC .............................. 347/12; 347/40
(58) Field of Classification Search
USPC .................... 347/12, 13, 15, 40–43
See application file for complete search history.

(56) References Cited

U.S. PATENT DOCUMENTS

| | | | |
|---|---|---|---|
| 6,203,133 B1 | 3/2001 | Tanaka | |
| 2007/0236745 A1* | 10/2007 | Noguchi et al. | 358/3.24 |
| 2010/0118079 A1* | 5/2010 | Yamaguchi et al. | 347/14 |

FOREIGN PATENT DOCUMENTS

JP    9-46522    2/1997

OTHER PUBLICATIONS

U.S. Appl. No. 13/354,859, filed Jan. 20, 2012.

\* cited by examiner

*Primary Examiner* — Manish S Shah
*Assistant Examiner* — Yaovi Ameh
(74) *Attorney, Agent, or Firm* — Fitzpatrick, Cella, Harper & Scinto

(57) ABSTRACT

An ink jet printing apparatus, for each level, employs a plurality of density patterns to prevent cancellation of a granularity reduction effect that has been provided by an increase in resolution. Specifically, when determining an arrangement of dot-on areas in the density pattern, the dot-on areas is not located in the areas of a first row of the each of the plurality of density patterns. Thereby, whitish areas appear with the same cycle as a use cycle of the density patterns in a longitudinal direction and thus the whitish areas is not unevenly located. As a result, granularity is prevented from increasing.

13 Claims, 21 Drawing Sheets

PIXEL TO BE PROCESSED
(600dpi VERTICALLY/
600dpi HORIZONTALLY)

N-VALUED
PROCESSING RESULTS
LEVELS 0 TO 16
(600dpi VERTICALLY/
600dpi HORIZONTALLY)

DENSITY PATTERN
(2400dpi VERTICALLY
× 2400dpi HORIZONTALLY)

n-TH COLUMN    (n+1)-TH COLUMN n-TH COLUMN    (n+1)-TH COLUMN

DENSITY PATTERN

| 1 | 2 | 3 | 4 |
|---|---|---|---|
| 5 | 6 | 7 | 8 |
| 9 | 10 | 11 | 12 |
| 13 | 14 | 15 | 16 |

FIG.12A

ACTUAL DOT LANDING POSITION

| A | B |
|---|---|
| C | D |
| E | F |
| G | H |

FIG.12B

FORWARD SCAN

| 1 | 3 |
|---|---|
| 5 | 7 |
| 9 | 11 |
| 13 | 15 |

BACKWARD SCAN

| 2 | 4 |
|---|---|
| 6 | 8 |
| 10 | 12 |
| 14 | 16 |

FIG.12C

PRINT DATA GENERATION APPARATUS AND PRINT DATA GENERATION METHOD

BACKGROUND OF THE INVENTION

1. Field of the Invention

The present invention relates to a print data generation apparatus and a print data generation method for quantizing image data, and employing the quantized image data to generate print data based on density patterns.

2. Description of the Related Art

For image data quantization, there is one well known method that employs a density patterns or an index pattern that describes an arrangement of binary print data for respective areas in a single pixel of image data. According to this method, 256-valued image data are quantized to obtain N-valued data, which are smaller than the 256-valued data, and density patterns of N levels that correspond to values 0 to N−1 of the N-valued data, are prepared and employed according to the value of 0 to N−1 so as to determine printing (dot) being on or off for each of unit pixels (unit areas), which form a single pixel. That is, the density pattern defines an arrangement of a number of dots that corresponds to each of N levels. Since this method requires only a small amount of processing of quantization, quantization at high resolution can be performed especially in short period of time.

Among the methods for performing quantization using density patterns, a method for employing, for one level, a plurality of density patterns, for which different dot arrangement patterns are provided is known (Japanese Patent Laid-Open No. H09-046522 (1997)). In the case of employing the same (one) density pattern for one level, periodicity of the pattern is increased, and accordingly, interference by the pattern tends to occur. In contrast to this, the method described in Japanese Patent Laid-Open No. H09-046522 (1997) can eliminate the periodicity of a pattern to avoid the interference due to the pattern, by employing the plurality of patterns sequentially for one level.

The smaller the size of dots formed with ejected ink is made, the more granularity due to the formed dots can be reduced. In this extent, increasing the printing resolution is preferable for a reduction in the granularity. In this case, the method employing the density patterns makes the resolution of the density pattern higher than the resolution of image data to be quantized. For example, in a case where quantization by an error diffusion is performed for image data having a resolution of 600 dpi×600 dpi to obtain binary print data having a resolution of 1200 dpi×1200 dpi, a density pattern is a pattern in which 2 areas (unit pixels)×2 areas (unit pixels) correspond to one pixel of image data.

With the configuration described in Japanese Patent Laid-Open No. H09-046522 (1997), in which a plurality of density patterns are employed for each level of quantized data, a dot pattern for level 1, i.e., for a case where one dot is on (printed), can be a pattern in which a dot is on at one of the four areas of 2 areas×2 areas. In a case for level 2, i.e., a case where two dots are on, six patterns are available for an arrangement in which dots are on at two of the four areas. This is the matter of a calculation for a combination that is performed by selecting two areas out of four areas, and is represented by $_4C_2$. Similarly, in a case for level 3, this calculation is represented by $_4C_3$. In a case of processing performed for a higher resolution, e.g., a case where quantization is performed for image data having a resolution of 600 dpi×600 dpi to obtain binary print data having a resolution of 2400 dpi×2400 dpi, a density pattern employed is a pattern of 4 areas×4 areas. Then the number of density patterns employed for one level is also increased, and for example, in the case for level 1, i.e., a case where one dot is on at only one area, 16 patterns are available. As described above, when the printing resolution is increased, the number (or the types) of density patterns that can be set for each level is greatly increased.

However, when the number of density patterns available for one level is increased, a granularity reduction effect that has been provided by an increase in resolution may be canceled. More specifically, there are areas in the density patterns where a dot (print data of "1") is not arranged in accordance with the levels, and these areas are recognized as whitishness in a printed image, i.e., as low-density image portions. Then, when a plurality of density patterns having different dot arrangements are sequentially employed, the whitishness may appear non-periodically. In such a case, the non-periodic whitishness is eccentrically distributed, and noticeable granularity may be observed in the printed image. Further, as described above, since the number of density patterns employed for one level is increased as the printing resolution becomes higher, the probability that whitishness will be unevenly distributed is increased.

SUMMARY OF THE INVENTION

The objective of the present invention is to provide a print data generation apparatus and a print data generation method which, for each level, employ a plurality of density patterns to prevent cancellation of a granularity reduction effect that has been provided by an increase in resolution.

In a first aspect of the present invention, there is provided a print data generation apparatus that generates binary print data used for perform printing to each of a plurality of pixel areas on a print medium by performing scanning by a print head for printing dots in a predetermined direction relative to the print medium, the apparatus comprising: a converting unit configured to use a density pattern, which has two or more areas for specifying an arrangement of dots to be printed, in one direction of the predetermined direction and a direction intersecting the predetermined direction, the density pattern corresponding to a level of the multi-valued data and the level defining that the number of dots, which is smaller by one than the number of the areas of the density pattern in the one direction, are printed to the pixel area, so that a plurality of density patterns, which correspond to the levels defining that the same number of dots are printed and in which the arrangements of dots to be printed are different from each other, are changed to be used according to positions of the pixel area in the one direction, a plurality of areas which are located at same positions in the one direction are defined as areas specifying that dot is not to be printed, to convert the multi-valued data, which represents the level of each of a plurality of pixel areas in a predetermined region of image data, into the binary print data.

In a second aspect of the present invention, there is provided a print data generation apparatus that generates binary print data used for perform printing to each of a plurality of pixel areas on a print medium by performing scanning by a print head for printing dots in a predetermined direction relative to the print medium, the apparatus comprising: a converting unit configured to use a density pattern, which has two or more areas for specifying an arrangement of dots to be printed, in one and the other directions of the predetermined direction and a direction intersecting the predetermined direction and in which the number of areas in the one direction is greater than that in the other direction, the density pattern corresponding to a level of the multi-valued data and the level defining that the number of dots, which is smaller by one than the number of the areas of the density pattern in the one direction, are printed to the pixel area, so that a plurality of density patterns, which correspond to the levels defining that the same number of dots are printed and in which the arrangements of dots to be printed are different from each other, are changed to be used according to positions of the pixel area in the one and the other directions, a plurality of areas which are located at same positions in the one direction are defined as areas specifying that dot is not to be printed, to convert the multi-valued data, which represents the level of each of a plurality of pixel areas in a predetermined region of image data, into the binary print data.

In a third aspect of the present invention, there is provided a print data generation method of generating binary print data used for perform printing to each of a plurality of pixel areas on a print medium by performing scanning by a print head for printing dots in a predetermined direction relative to the print medium, the method comprising: a converting step of using a density pattern, which has two or more areas for specifying an arrangement of dots to be printed, in one direction of the predetermined direction and a direction intersecting the predetermined direction, the density pattern corresponding to a level of the multi-valued data and the level defining that the number of dots, which is smaller by one than the number of the areas of the density pattern in the one direction, are printed to the pixel area, so that a plurality of density patterns, which correspond to the levels defining that the same number of dots are printed and in which the arrangements of dots to be printed are different from each other, are changed to be used according to positions of the pixel area in the one direction, a plurality of areas which are located at same positions in the one direction are defined as areas specifying that dot is not to be printed, to convert the multi-valued data, which represents the level of each of a plurality of pixel areas in a predetermined region of image data, into the binary print data.

According to the above configuration, cancellation of a reduction in granularity, provided by an increase in resolution, can be prevented by employing a plurality of density patterns for each level.

Further features of the present invention will become apparent from the following description of exemplary embodiments (with reference to the attached drawings).

BRIEF DESCRIPTION OF THE DRAWINGS

FIGS. 12A to 12C are schematic diagrams for explaining the print data generation processing performed in the fourth embodiment;

DESCRIPTION OF THE EMBODIMENTS

The embodiments of the present invention will now be described in detail, while referring to the accompanying drawings.

Figure 1:
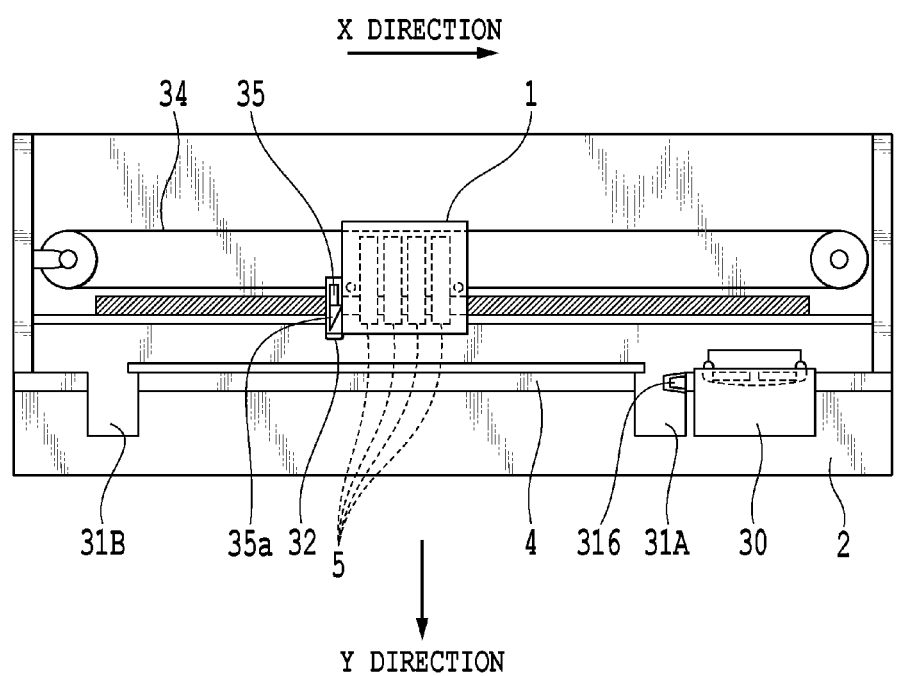
FIG. 1 is a plan view of an ink jet printing apparatus for which the individual embodiments of the present invention are applied.

FIG. 1 is a plan view of an ink jet printing apparatus according to an embodiment of the present invention. A main body 2 of the ink jet printing apparatus includes a conveying unit (not shown) for conveying a print medium in the Y direction (conveying direction). The main body 2 also includes a carriage 1 which is capable of moving along a guide shaft (not shown) so as to reciprocate in a main scanning direction. To effect the reciprocal movement of the carriage 1 in the main scanning direction (X direction), which intersects the conveying direction, power is to be supplied by a carriage motor (not shown) via a belt 34 to the carriage 1. A plurality of print heads, for each of which a plurality of ink ejection nozzles are provided, are mounted on the carriage 1, and as the carriage 1 is moved as described above, scanning by the print heads, in the main scanning direction, is enabled. Further, a plurality of ink tanks 5, wherein inks having a variety of colors are stored corresponding to the print heads, are also mounted on the carriage 1. In addition, an optical sensor 32 is provided for the carriage 1. When the carriage 1 is moved in the main scanning directions, the optical sensor 32 is also moved to detect the presence or absence of a print medium, such as a printing sheet, on a platen 4. Furthermore, the ink jet printing apparatus of the embodiment includes a non-ejection nozzle detection unit (not shown), which has a light projecting portion and a light receiving portion for detecting, for individual nozzles of the print heads, whether ink is ejected. Specifically, an optical path, extending from the light projecting portion to the light receiving portion, is examined to determine whether or not ink droplets are present and are blocking the optical path, so that for individual nozzles, whether or not ink is ejected can be determined.

The ink jet printing apparatus also includes a print head recovery mechanism in order to maintain the nozzles of the print heads in an appropriate ejection condition. The recovery mechanism provided for this purpose is a so-called suction recovery mechanism 30, wherein the ejection ports (herein after also referred as nozzles) formed at the front ends of the print head nozzles are covered with caps, which are connected to a pump, and then a negative pressure is generated in the caps, by the pump, to discharge viscous ink in the nozzles by suction.

Figure 2:
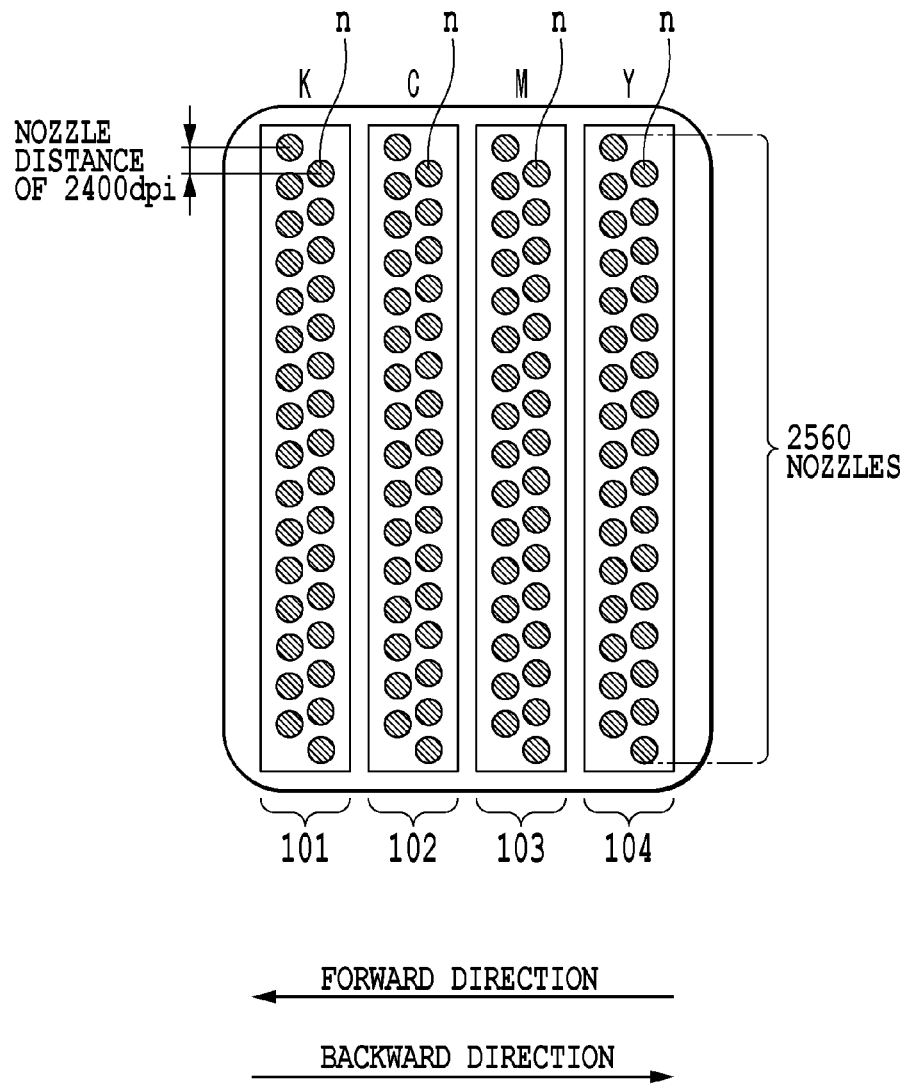
FIG. 2 is a schematic front view of the ejection port arrays of print heads that are employed by the printing apparatus shown in FIG. 1.

FIG. 2 is a schematic front view of the ejection port arrays of the print heads employed by the ink jet printing apparatus shown in FIG. 1. For the embodiment of the present invention, print heads 101, 102, 103 and 104 are used to eject inks in four colors, black (K), cyan (C), magenta (M) and yellow (Y) respectively. A plurality of ink ejection nozzles n are provided for the individual print heads. Each of nozzles communicates with an ink path (not shown). An electro-thermal transducing element is provided in the individual ink paths, and when ink is heated locally by the element, film boiling occurs in the ink, and ink ejection can be performed by using energy generated by bubbling of the ink.

Each of the print heads includes two nozzle arrays consisting of 2560 nozzles in total. The nozzles of the combination of the two arrays are arranged at a density of 2400 dpi in the sub-scanning direction, which is the direction in which a print medium is to be conveyed.

In an ink jet printing apparatus having the above described arrangement, a print medium is conveyed in the sub-scanning direction by the conveying unit (not shown). The print heads receive print data from a printing controller (not shown), and while being moved in the main scanning direction by the carriage 1, eject ink onto the print area of the print medium. This printing operation and the conveying operation for conveying the print medium a predetermined distance in the sub-scanning direction are repeated to perform printing.

Figure 3:
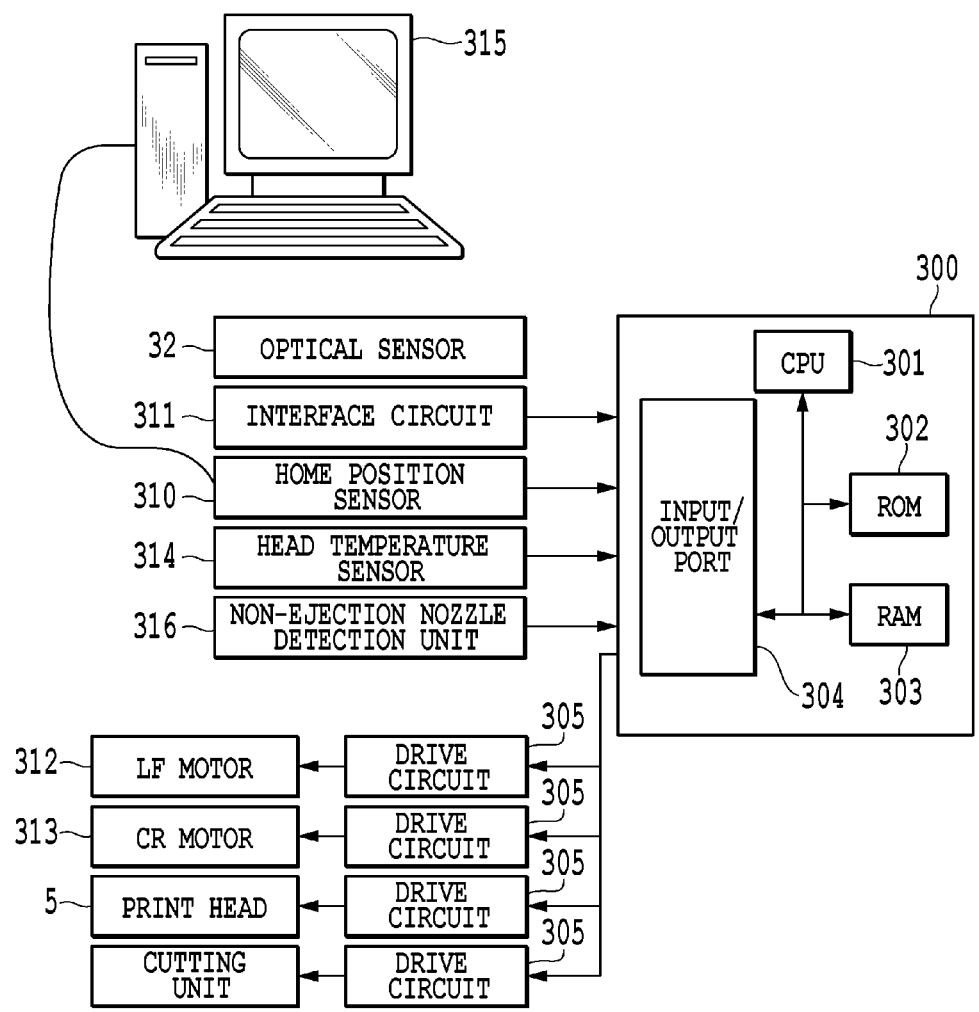
FIG. 3 is a schematic block diagram illustrating the control system arrangement of the printing apparatus shown in FIG. 1.

FIG. 3 is a schematic block diagram illustrating the arrangement of the control system of the ink jet printing apparatus shown in FIG. 1. A main controller 300 performs the processing, such as data processing, performed by the printing apparatus, that includes the generation of print data based on a density pattern, which will be described later while referring to FIG. 5 and the drawings following FIG. 5, and the control of the individual operations. Specifically, a CPU 301 performs the processing in accordance with a control program that is stored in a ROM 302 for the above described processing. A RAM 303 is employed as a work area, such as a print data buffer, when processing is to be performed. Through an input/output port 304, the transmission and the reception of data by the individual sections is performed for data processing and for driver control. More specifically, drive circuits 305, 306, 307 and 308 are connected to the input/output port 304 to respectively drive a line feeding motor (LF motor) 312, a carriage motor (CR) motor 313, print heads 5 and an actuator for a cutting unit. Moreover, various sensors are also connected to the input/output port 304; for example, a head temperature sensor 314 for detecting print head temperatures, a home position sensor 310 for detecting the presence of the carriage 1 at the home position for the performance of perform the recovery operation for the print heads 5, and a non-ejection nozzle detection unit for examining the ejection state of the print heads 5 (corresponding to the print heads 101 to 104). Further, the main controller 300 is connected via an interface circuit 311 to a host computer 315.

The print data generation processing performed by the ink jet printing apparatus having the above described configuration will now be described below.

For the embodiments of the present invention, density patterns are employed to determine whether or not a dot is formed, i.e., to generate binary print data that represent ejection or non-ejection of ink from the individual nozzles of the print heads, with respect to multi-valued input image data. For this binarization processing, quantization is performed for 8-bit, 256-valued image data to obtain data of a lower resolution, and based on the quantized image data, binary image data is generated using density patterns.

Figure 4A:
FIGS. 4A to 4C are schematic diagrams showing an outline of the processing, applied for the individual embodiments of the present invention, beginning with the reception of multi-valued data by the printing apparatus and culminating with the generation of print data.
Figure 4B:
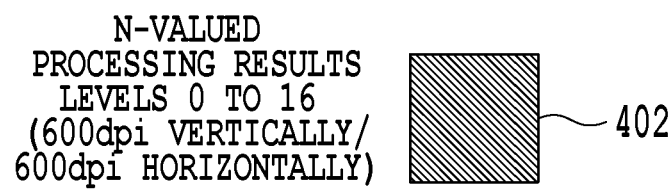
Figure 4C:
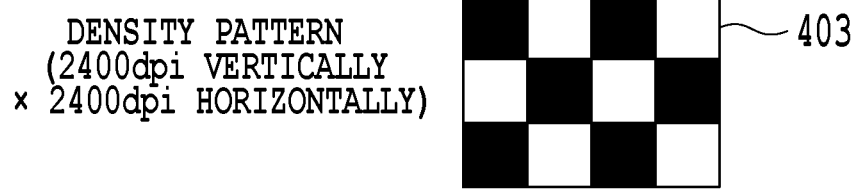

FIGS. 4A to 4C are diagrams for explaining the outline of the processing performed beginning with the reception of multi-valued input data and continuing until print data are generated, by the printing apparatus. Image data received from the host computer 315 consists of pixels 401, shown in FIG. 4A, arranged at a resolution of 600 dpi longitudinally and 600 dpi horizontally, and the individual pixels 401 have pixel values of 0 to 255, respectively. Through the quantization process, the input image data are changed to 17-valued data for the individual pixels 401, and data consisting of pixels 402, shown in FIG. 4B, are obtained at the same resolution, 600 dpi longitudinally and 600 dpi horizontally. The 17-valued data includes 17 levels of pixel values, 0 to 16, and these values are employed as indexes for density patterns that are to be used for the following processing.

Next, for each pixel, a density pattern is selected in accordance with a level represented by the 17-valued data. FIG. 4C shows a density pattern 403 for a level 8 as an example, and shows a pattern of 4 areas longitudinally by 4 areas horizontally, in accordance with one of the pixels 402 (pixel areas) for 17-valued data. In FIG. 4C, solid black areas indicate areas (dot-on areas) wherein dots are to be formed (areas of "1" that indicates the ejection of ink) By employing this density pattern, binary data for an area 403 of the same pattern, consisting of 4 unit pixels longitudinally by 4 unit pixels horizontally, can be obtained. More specifically, the area arrangement of the density pattern corresponds to the unit pixel arrangement in the printing area that has the same size as the density pattern, and therefore, it can be said that the area arrangement and the unit pixel arrangement match each other. Through the above described manner, print data is finally generated with a higher resolution of 2400 dpi longitudinally by 2400 dpi horizontally. In the following description of embodiments of the density pattern, a plurality of density patterns are prepared for each level, and are sequentially employed in a predetermined order. This order is determined according to a density pattern position matrix that has predetermined sizes both in a sub-scanning direction (longitudinally) and in the main scanning direction (transversely), and that defines a density pattern to be employed for each pixel of image data.

Referring to FIG. 3, when the main controller 300 generates print data as the above described manner, the CPU 301 employs a program stored in the ROM 302 and data stored in the RAM 303 so as to drive the individual motors and the print head 5 via the input/output port 304 to initiate a printing operation.

As for the processing explained while referring to FIGS. 4A to 4C, the quantization of image data into 17-valued data and the generation of print data, by employing density patterns corresponding to the quantized image data, have been performed by the ink jet printing apparatus. However, the application of the present invention is not limited to this example. For example, quantization of image data may be performed by a host apparatus, or both the data quantization and the generation of binary print data may be performed by the host apparatus.

Several embodiments of the above described density patterns or manners to use the density patterns will now be described.

First Embodiment

A first embodiment of the present invention relates to a mode in which one pixel of quantized data is expanded to be binary data by using a density pattern of 4 areas×4 areas, and a plurality of density patterns set for the same quantization level (density gradation level), are used in a predetermined order longitudinally (in the sub-scanning direction). Specifically, for a specific quantization level where a portion (whitish area) in which dots are not formed in all of areas in a transverse direction is present in a density pattern of 4 areas×4 areas, density patterns are determined so that the whitish areas cyclically appear in the longitudinal direction.

First, through experiments, the inventors of the present invention confirmed that there is a density gradation level at which a whitishness in a printed image appears to be noticeable in a subtle way, as a density gradation level at which the degrading of granularity is greater than at another gradation level. For example, in a case where a density pattern has four areas in the longitudinal direction, and where a plurality of density patterns, for which dot-on areas differ from each other, are employed in a predetermined order in the longitudinal direction, the inventors have found that it is important that dot-on areas be appropriately arranged for density patterns at level 3 that employ three dots, the value of which is fewer by one than a number of areas in the longitudinal direction of the pattern. The reason for this is as follows. In many cases, the nozzle arrays are designed while taking into account a relationship between the resolution and the dot diameter, so that in the case that dots are formed by inks ejected from all of the nozzles, a print medium can be sufficiently coated with ink. Therefore, when a number of dot-on areas is smaller by one than the longitudinal size of the pattern, the whitishness tend to be noticeable. Then, if whitish areas are unevenly distributed when a plurality of density patterns are used in a predetermined order in the longitudinal direction, it is thought that granularity is greatly degraded. Therefore, it is important for dot-on areas to be arranged in density patterns to avoid, to the greatest extent possible, the uneven distribution of whitish areas.

According to the first embodiment of the present invention, for density patterns of level 3 that are used longitudinally in a predetermined order, the whitish area are allocated to the same rows of patterns in the longitudinal direction. Thereby, the longitudinal repetition cycle for the whitish areas in the density patterns aligned longitudinally is the same as the repetition cycle of the density patterns, and uneven distribution of the whitish areas is prevented. Furthermore, three dot-on areas are allocated to different rows in the longitudinal direction, so that the degrading of granularity can be effectively suppressed.

Figure 5A:
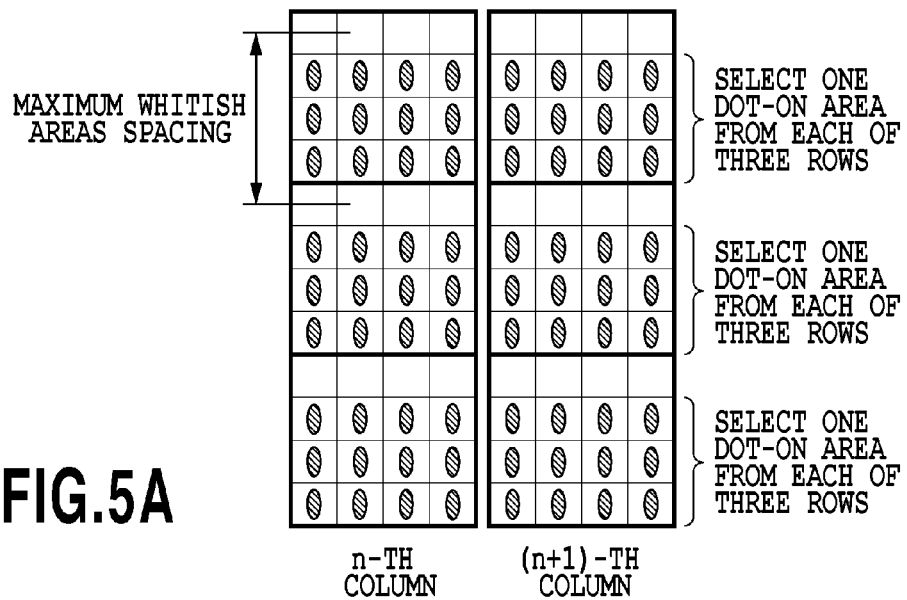
FIG. 5A is a diagram showing dot arrangement choices, according to a first embodiment of the present invention, that can be selected for the creation of density patterns.
Figure 5B:
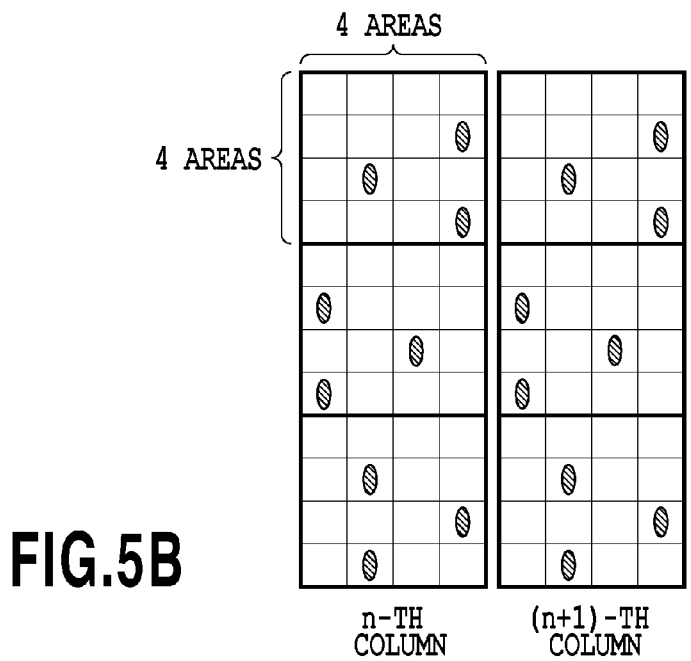
FIG. 5B is a diagram for explaining the density patterns determined by selecting dot-on positions and the method for employing the density patterns.

FIG. 5A is a diagram showing dot-on area choices that can be selected to prepare density patterns in this embodiment. FIG. 5B is a diagram showing the density patterns of this embodiment that are determined by selecting dot-on areas, and showing a method for using the density patterns.

As shown in FIG. 5A, when dot-on areas are determined for the density patterns, dot-on areas are not allocated at the first rows of the individual density patterns used (aligned) in the longitudinal direction. Then, in this embodiment, one dot-on area is selected from each of the second to fourth rows of the individual density patterns. Further, when one dot-on area is selected from each of the second to the fourth rows of the density patterns, as shown in FIG. 5B, positions for the selected dot-on areas are determined so that between adjacent rows of areas, the positions for the dot-on areas are separated by a distance corresponding to one area in the transverse direction. As a result, the dot-on areas selected for the second to the fourth rows almost forma triangle. Through this process, four density patterns are obtained for level 3. In FIG. 5B, only three density patterns are shown, and the remaining density pattern is a pattern obtained by shifting to the left one area, the topmost dot-on area arrangements shown on the n-th and (n+1)-th columns of the density patterns. In this embodiment, these four density patterns are repetitively and sequentially used in the longitudinal direction, when performing binarization for the quantized data of level 3. According to this embodiment, the dot-on areas of the density patterns are arranged to form a triangle, and the density patterns are repetitively used in the order shown in FIG. 5B. Thereby, the individual dots that are printed are those that are separated the farthest from each other. Therefore, in this embodiment, a greater reduction in the occurrence of the whitishness areas can be realized.

As described above, when the density patterns of this embodiment are employed, the whitish areas appear in the longitudinal direction in the same cycle (equivalent to four rows in the longitudinal direction) as the cycle in which the density patterns are used, and as a result, the whitishness areas are not unevenly distributed, and noticeable granularity can be prevented.

Figure 6:
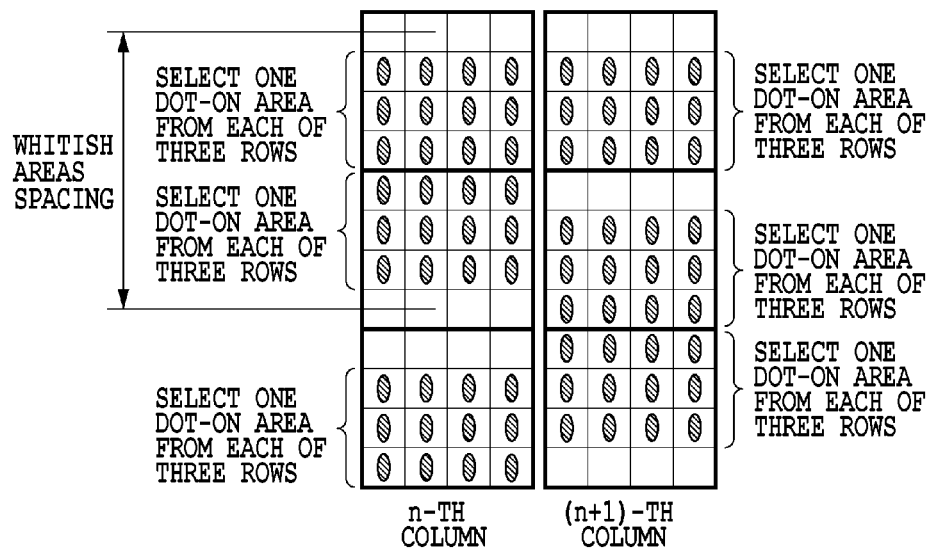
FIG. 6 is a diagram showing a comparison example for the dot arrangement choices shown in FIG. 5A.

FIG. 6 is a diagram showing an example for a comparison with the dot-on arrangement choice shown in FIG. 5A. The comparison example in FIG. 6 shows density patterns, aligned in the longitudinal direction, where rows in which dot-on areas are not allocated differ from each other. Specifically, for the n-th density pattern column, dot-on areas are not allocated in the first row of the first top density pattern, the fourth row of the second top density pattern, and the first row of the third top density pattern. Further, in the (n+1)-th density pattern column, dot-on areas are not allocated in the first row of first top density pattern, the first row of the second top density pattern, and the fourth row of the third top density pattern. As a result, as the cycle for whitish areas, there is not only a cycle equivalent to four rows, as shown in FIG. 5A, but also a long cycle equivalent to seven rows. As is apparent from the comparison example, a longitudinal repetition cycle of whitish areas in the longitudinal direction becomes longer than the repetition cycle of the density patterns.

Figure 7A:
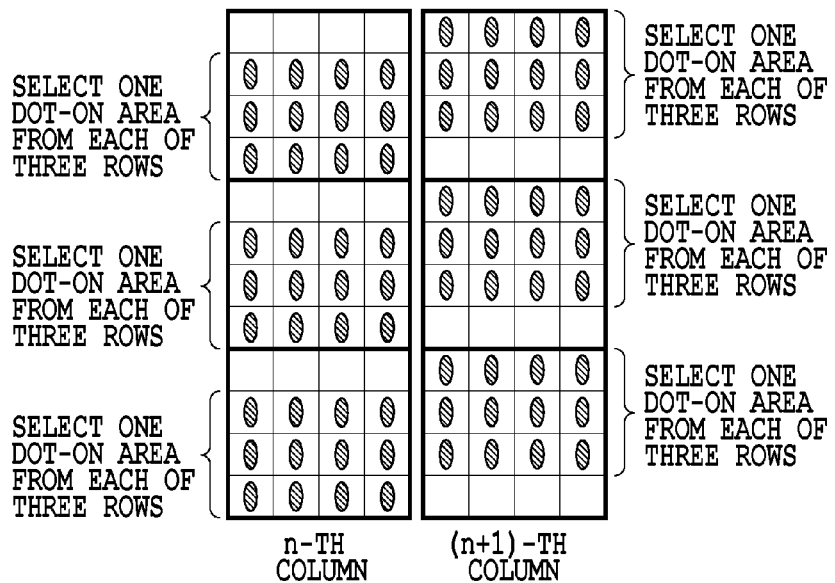
FIGS. 7A and 7B are diagrams, for another example of the first embodiment, respectively showing dot arrangement choices and density patterns that are determined by selecting dot-on positions.
Figure 7B:
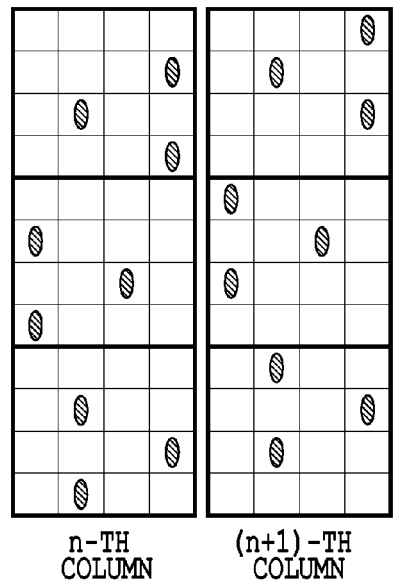

FIGS. 7A and 7B are diagrams showing dot-on area arrangement choices, according to another example of this embodiment, and density patterns that are determined by selecting dot-on areas, and is similar figures to FIGS. 5A and 5B.

When the examples in FIG. 5A and in FIG. 7A are compared with each other, the dot-on area choices in FIG. 5A are in the same positions between the density patterns aligned transversely, while the dot-on area choices in FIG. 7A are in different positions. Specifically, in FIG. 5A, for the n-th density pattern column, dot-on areas are not allocated for the first rows of the individual patterns. For the (n+1)-th density pattern column, dot-on areas are not allocated for the fourth rows of the individual density patterns. Then, for the n-th column and the (n+1)-th column, no dot-on areas are allocated for the same rows. Likewise, in FIG. 7B, only three density patterns are shown, and actually, the four density patterns are repetitively and sequentially used for the n-th column and the (n+1)-th column. As a result, as the example in FIG. 5A, the longitudinal repetition cycle of whitish areas is the same as the repetition cycle of the density patterns.

The density patterns shown in FIG. 7B are determined by selecting dot-on areas in FIG. 7A. As shown in FIG. 7B, for the n-th column, the four density patterns aligned in the longitudinal direction are repetitively and sequentially used, and for the adjacent (n+1)-th column, different four density patterns aligned in the longitudinal direction are repetitively and sequentially used. Although not shown for the (n+2)-th column and the following columns, the density patterns provided for the n-th column and the density patterns provided for the (n+1)-th column are repeated.

As described above, the importance of this embodiment is that when a plurality of patterns are determined for a density gradation level that employs a number of dots that are fewer by one than the longitudinal size of a density pattern and these density patterns are used in the longitudinal direction in a predetermined order, dot-on areas are allocated for the density patterns aligned in the longitudinal direction so that the arrangement of dot-on areas has following characteristics. More specifically, in the processing for converting multi-valued data into binary print data with density patterns being changed to be used in accordance with the position of a pixel for the multi-valued data in the longitudinal direction, the same rows in the longitudinal direction (a plurality of areas located in the same positions in the longitudinal direction) are not used for allocating dot-on areas for the density patterns aligned in the longitudinal direction. As a result, the longitudinal repetition cycle of whitish areas of the density patterns aligned in the longitudinal direction is the same as the repetition cycle of the density patterns, and the uneven distribution of whitishness can be prevented.

In the above description, for all of the density pattern columns (the n-th column and the (n+1)-th column), the same rows of density patterns that are repetitively employed in the longitudinal direction are not selected. However, this may be applied only for one density pattern column (e.g., the n-th column).

Furthermore, in this embodiment, a plurality of density patterns have been repetitively used in the longitudinal direction. However, the same arrangement may also be employed when a plurality of density patterns are repetitively used in the transverse direction (main scanning direction). That is, when multi-valued data is converted into binary print data with density patterns being changed to be used in accordance with the transverse position of a pixel having the multi-valued data, the same columns in the transverse direction (a plurality of areas located in the same transverse direction) are not used for allocating the dot-on areas for the individual density patterns aligned in the transverse direction.

Further, density patterns having the same longitudinal and horizontal size have been employed for this embodiment; however, the present invention can also be applied for density patterns for which the horizontal size and the longitudinal size are different from each other. When these density patterns are repetitively employed in the longitudinal direction, the characteristics, as described in the embodiment, need only be provided for the density patterns, for a density gradation level that is smaller by one than the longitudinal size of the density pattern. Further, when such density patterns are employed repetitively in the transverse direction, the same characteristics as those described in the embodiment need only be provided for the density patterns for a gradation level that is smaller by one than the transverse size of the density pattern.

In this embodiment, a plurality of density patterns have been used longitudinally in a predetermined order; however, a plurality of patterns may be used at random. In this case, however, as described above, it is appropriate that dot-on arrangements for the individual patterns and a predetermined order for using the density patterns be determined, so that the dots can be printed that are separated the farthest from each other.

Furthermore, although a quantization level (density gradation level) other than level 3 has not been especially explained, an arbitrary dot-on arrangement may be employed for a quantization level other than level 3. However, it is preferable that for a density pattern for level 4 or higher, at least one dot be allocated for each of the rows (four rows) in the longitudinal direction.

Second Embodiment

A second embodiment of the present invention, as well as the first embodiment, relates to the dot-on area arrangement of density patterns for level 3, each of which consists of 4 areas longitudinally×4 areas horizontally. A difference in the second embodiment is that whitish areas in the density patterns are periodically allocated not only in the longitudinal direction, but also in the transverse direction.

Figure 8A:
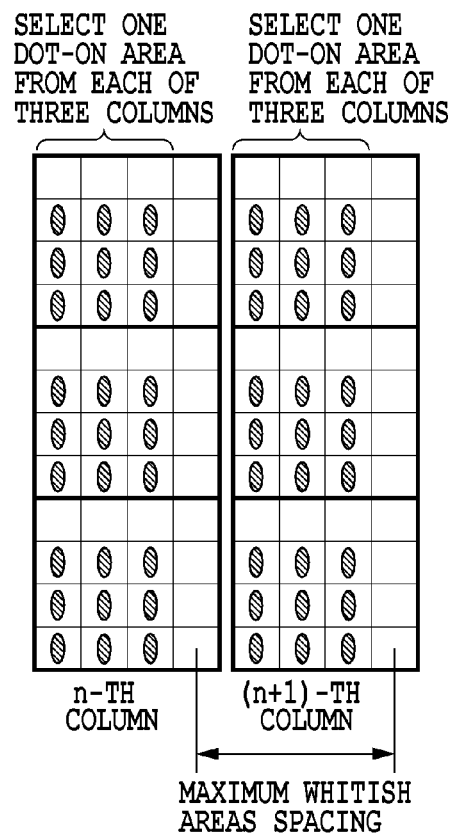
FIG. 8A is a diagram showing dot-on position choices according to a second embodiment of the present invention.
Figure 8B:
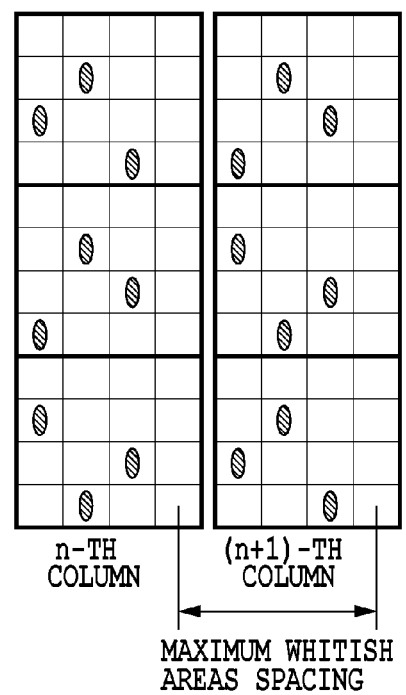
FIG. 8B is a diagram showing density patterns obtained by selecting dot-on positions.

FIG. 8A is a diagram showing dot-on area choices to be selected, and FIG. 8B is a diagram showing density patterns obtained by selecting three dot-on areas for level 3. According to this embodiment, as shown in FIG. 8A, the longitudinal repetition cycle of whitish areas in the density patterns aligned longitudinally matches the repetition cycle of the density patterns, and the transverse repetition cycle of whitish areas in the density patterns aligned in the transverse direction also matches the repetition cycle of the density patterns. Then, as shown in FIG. 8B, one dot-on area is selected from each of dot-on area choices for the individual rows and columns of the density patterns aligned in the longitudinal and transverse directions. Specifically, dot-on areas are selected for the individual density patterns, so that the dot-on areas do not overlap at the same locations between the adjacent rows or between the adjacent columns, and the density patterns shown in FIG. 8B are obtained. Therefore, according to this embodiment, three density patterns, aligned longitudinally for each column, are used repetitively and sequentially for level 3. Further, although the (n+2)-th column and the following columns in the transverse direction are not shown in FIGS. 8A and 8B, the density patterns of the n-th column and the density patterns of the (n+1)-th column are repetitively employed for the (n+2)-th column and the following columns.

Figure 9A:
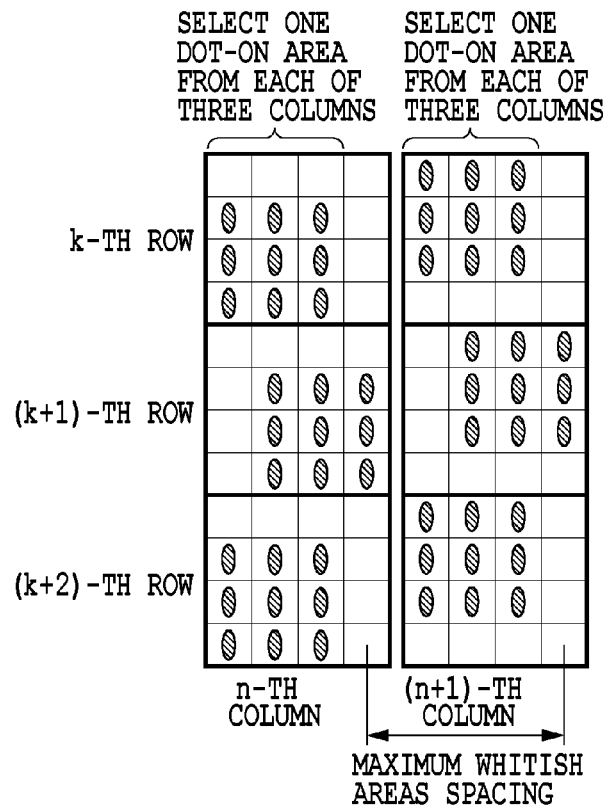
FIGS. 9A and 9B are diagrams for another example of the second embodiment, respectively showing dot arrangement choices and density patterns that are determined by selecting dot-on positions.
Figure 9B:
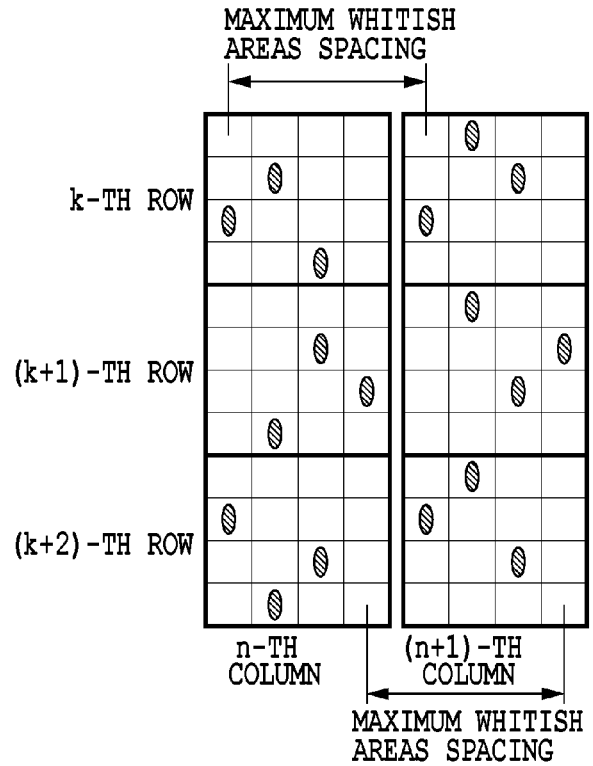

FIGS. 9A and 9B are diagrams, corresponding to FIGS. 8A and 8B, showing another example for the second embodiment of dot-on area arrangement choices and density patterns that are determined by selecting dot-on areas. Referring to FIG. 9A, in the density patterns longitudinally aligned for the n-th column, areas that are not dot-on area arrangement choices are allocated in the rows at the same positions (first top rows). In the density patterns longitudinally aligned for the adjacent (n+1)-th column, areas that are not dot-on area arrangement choices are also allocated in the rows at the same positions (first bottom rows), which are at a different position than that for the n-th column. That is, for the density patterns that are longitudinally aligned, the rows at the same position are employed to allocate areas that are not dot-on area arrangement choices, and as a result, the longitudinal repetition cycle of whitish areas completely matches the repetition cycle of the density patterns.

The same thing is applied for the density patterns aligned in the transverse direction. Referring to FIG. 9A, for the density patterns transversely arranged on the k-th row, columns at the same position are employed to allocate the areas that are not dot-on area arrangement choices. As for the (k+1)-th row density patterns that are longitudinally adjacent to the k-th row density patterns and the (k+2)-th row density patterns that are longitudinally adjacent to the (k+1)-th row density patterns, columns at different positions from that for the k-th row are employed to allocate areas that are not dot-on area arrangement choices, but the areas that are not dot-on area choices appear on the same columns in the density patterns aligned in the transverse direction on the k-th row to the (k+2)-th row. Although the density patterns aligned in the transverse direction for the (n+2)-th column and the following columns are not shown in this case, the density pattern arrangement on the n-th column and the density pattern arrangement on the (n+1)-th column are repeated for the (n+2)-th column and the following columns. Therefore, for the density patterns aligned in the transverse direction, the columns at the same position are employed for areas that are not dot-on area choices, and the transverse repetition cycle of whitish areas completely matches the repetition cycle of density patterns.

When dot-on areas have been selected, the density patterns shown in FIG. 9B are obtained. Also, in this case, three types of density patterns longitudinally aligned for the individual columns are repetitively and sequentially used for level 3.

In this embodiment, when a plurality of density patterns are repetitively used in the longitudinal direction and in the transverse direction, employment of the rows at the same position in the longitudinal direction is avoided for allocating dot-on areas in these density patterns that are aligned longitudinally, and employment of the columns at the same position in the transverse direction is avoided for allocating dot-on areas in the density patterns that are aligned transversely. That is, in the case that a plurality of density patterns are repetitively used in both the longitudinal direction and the transverse direction, the first embodiment, as shown in FIGS. 7A and 7B, does not use the rows or the columns at the same position as the dot-on areas in the density patterns only in one direction (longitudinal direction in FIGS. 7A and 7B). Thereby, the uneven distribution of whitish areas in this one direction can be prevented. Whereas, in this embodiment, not only for one direction but also for the other direction, i.e., both for the longitudinal direction and the transverse direction, the usage of the same columns and the same rows is avoided for allocating dot-on areas in a plurality of density patterns. Therefore, the uneven distribution of whitish areas can be prevented for both the longitudinal direction and the transverse direction.

When a plurality of density patterns, for which the longitudinal and the horizontal sizes are different, are to be repetitively employed in the longitudinal direction and in the transverse direction, the same portions (columns or rows) should not be employed for these density patterns for a quantization level that is smaller by one than a greater size, either the longitudinal size or the horizontal size. For example, when density patterns each consisting of 2 areas longitudinally by 4 areas horizontally are repetitively employed in the longitudinal direction and in the transverse direction, the columns at the same position should not be employed for the density patterns for level 3 that are connected transversely.

Third Embodiment

A third embodiment of the present invention relates to the processing performed to expand 600 dpi quantized data into binary data by using density patterns, each formed of 3 areas horizontally by 3 areas longitudinally, that are prepared correspondingly to ten levels 0 to 9, represented by the quantized data. In this embodiment, a resolution lower than that in the first and second embodiments is employed for density patterns. That is, in the first and second embodiments, one pixel of 600 dpi quantized data can be expressed by arranging dots of 0 to 16, while in this embodiment, only a maximum nine dots can be employed for the expression. In this embodiment, therefore, the dot diameter, i.e., the volume of an ink droplet to be ejected is increased and is more than that in the first and second embodiments. As a result, although a smaller number of dots are arranged, the lowering of the density expressed on the printed image can be suppressed.

Figure 10A:
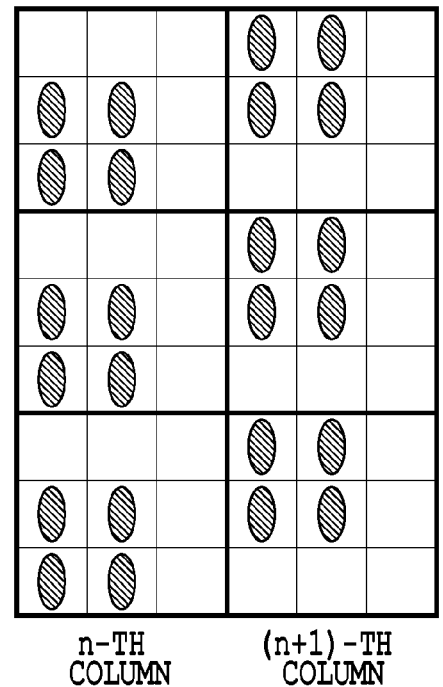
FIG. 10A is a diagram showing dot arrangement choices, for a third embodiment of the present invention, that can be selected for the creation of density patterns.
Figure 10B:
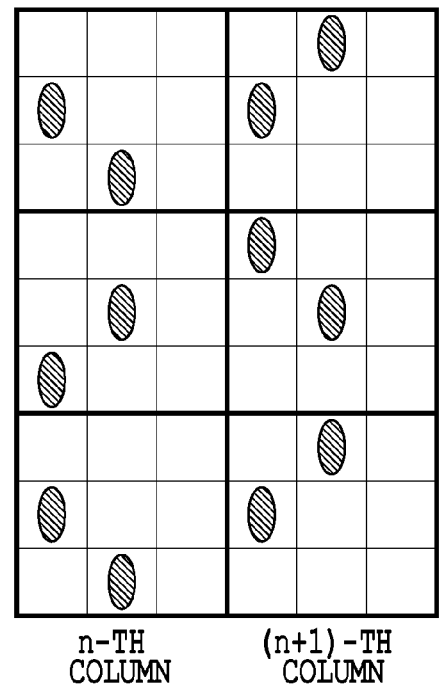
FIG. 10B is a diagram for explaining density patterns determined by selecting dot-on positions and the method for employing the density patterns.

As described above the 3 areas×3 areas size is employed for the density patterns of this embodiment, and thus the present invention is applied for level 2 (=3−1) of the density patterns. FIG. 10A is a diagram showing dot-on area arrangement choices to be selected. As well as in the first and second embodiments, for the density patterns aligned longitudinally for the n-th column and for the (n+1)-th column, the rows at the same positions are employed for areas for which dot-on choices are not allocated. For the density patterns aligned transversely, columns at the same positions are employed for areas for which dot-on choices are not allocated. As a result, the repetition cycles of whitish areas in the longitudinal direction and in the transverse direction match, respectively, the longitudinal and transverse repletion cycles of the density patterns. As shown in FIG. 10B, for the n-th column, three types of density patterns aligned longitudinally are repetitively and sequentially used, and for the adjacent (n+1)-th column, three different longitudinally aligned density patterns are repetitively and sequentially used.

As described above the density patterns for level 2 are prepared based on the density pattern size 3 areas×3 areas, and thus granularity can be reduced.

Fourth Embodiment

A fourth embodiment of the present invention relates to density patterns that are employed when the printing of only specific column data is performed for each scanning, i.e., so-called printing by column thinning is performed, in order to reduce a printing resolution for each scanning. Further, for print heads in this embodiment, nozzles are aligned in a single array for the individual ink color, and are arranged at pitches of 2400 dpi.

Figure 11:
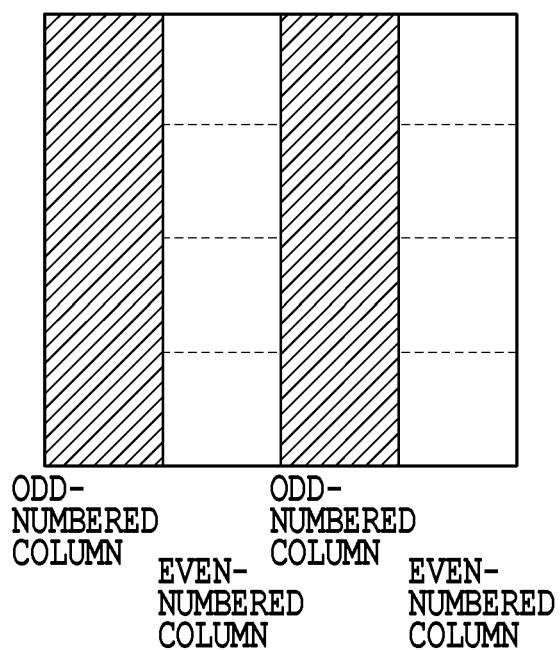
FIG. 11 is a diagram illustrating an example column thinning method performed in a fourth embodiment of the present invention.

FIG. 11 is a diagram showing an example of a column thinning method performed for this embodiment. According to the column thinning method, print data is divided into odd-numbered column data and even-numbered column data, and scanning is repetitively and sequentially performed based on the odd-numbered column data and based on the even-numbered column data. Therefore, column data to be employed for each scan is uniquely determined. Column data is sequentially allocated, from the left to the right, to print data of the unit area, consisting of 4 unit pixels horizontally (main scanning direction) by 4 unit pixels longitudinally shown in FIG. 11. When printing is performed based on this column data, the individual columns are printed as follows. When bi-directional printing, i.e., printing in the forward direction and the reverse direction, is to be performed by column thinning, the odd-numbered column data is printed by forward scanning and the even-numbered column data is printed by backward scanning, which is performed in the direction opposite that for the forward scanning.

FIGS. 12A to 12C are schematic diagrams for explaining print data generation processing for this embodiment. While taking the above described column thinning process performed for two-way printing into account, dot-on data for the individual areas of the density pattern shown in FIG. 12A are employed as follows. In the density pattern shown in FIG. 12A, dot-on area data indicated by odd numbers (1, 3, 5, 7, 9, 11, 13, 15) are employed as print data for the forward scanning. Further, the dot-on area data indicated by even numbers (2, 4, 6, 8, 10, 12, 14, 16) in the density pattern are print data employed for backward scanning.

FIG. 12B is a diagram for explaining dot forming positions (landing positions of ejected ink) employed when printing is actually performed based on binary print data that have been obtained, in the above described manner, based on the density patterns. As shown in FIG. 12B, printing is performed so that the resolution in the transverse direction (main scanning direction) is ½ the resolution provided by the area arrangement of the density patterns. In a case wherein the resolution of the density patterns is 2400 dpi longitudinally by 2400 dpi horizontally, the printing resolution is 2400 dpi longitudinally by 1200 dpi horizontally. Specifically, as shown in FIG. 12C, when ink is ejected based on binary print data that has been expanded for areas 1 and 2 of the density patterns, the ink lands at a position A. That is, an ink droplet is ejected during the forward scanning based on the dot-on state of the area 1, while an ink droplet is ejected during the backward scanning based on the dot-on state of the area 2, and these ink droplets land at the position A. Similarly, ink is ejected based on print data expanded for areas 3 and 4, and lands at a position B. Further, ink is ejected based on print data expanded for areas 5 and 6, and lands at a position C. Likewise, ink is ejected based on print data expanded for areas 7 and 8, and lands at a position D.

As described above, 4 areas×4 areas of the density pattern correspond to the size of four unit pixels in the longitudinal direction (direction in which nozzles are arranged), and the size of two unit pixels in the transverse direction (main scanning direction). In the fourth embodiment, while taking into account the longitudinal pattern size equivalent to four unit pixels, the present invention is applied for the dot-on area arrangement of density patterns for level 3 (=4−1). That is, as well as in the above described embodiments, the row on which dot-on areas are not allocated is at the same position in the density patterns that are longitudinally aligned. The dot-on area arrangement choices are, for example, those shown in FIG. 5A. As for the transverse direction, since the printing resolution is reduced to half, there are only two column choices relative to three dots to be selected, and two dots are allocated to either one of the two columns.

Figure 13:
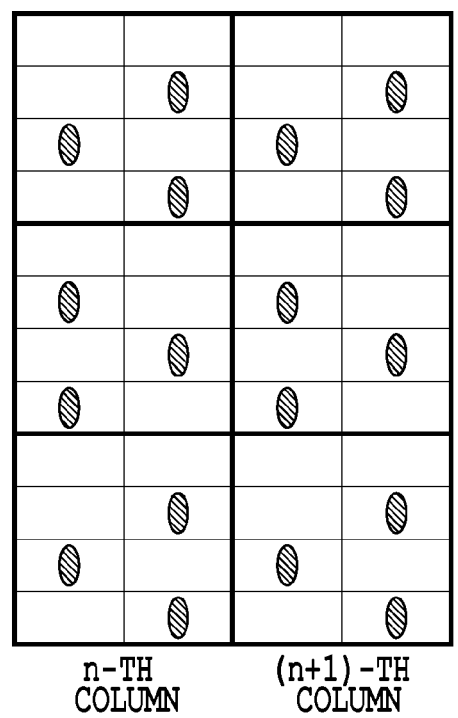
FIG. 13 is a diagram showing the dot-on positions in density patterns in consonance with a printing resolution.

FIG. 13 is a diagram showing the dot-on area arrangement for the thus obtained density patterns in accordance with the printing resolution. As is apparent from FIG. 13, the dot-on state is not entered on the first top rows of all the longitudinally aligned density patterns.

Figure 14A:
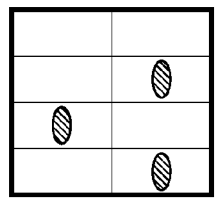
FIGS. 14A and 14B are diagrams for explaining density patterns that actually provide the dot arrangement shown in FIG. 13.
Figure 14B:
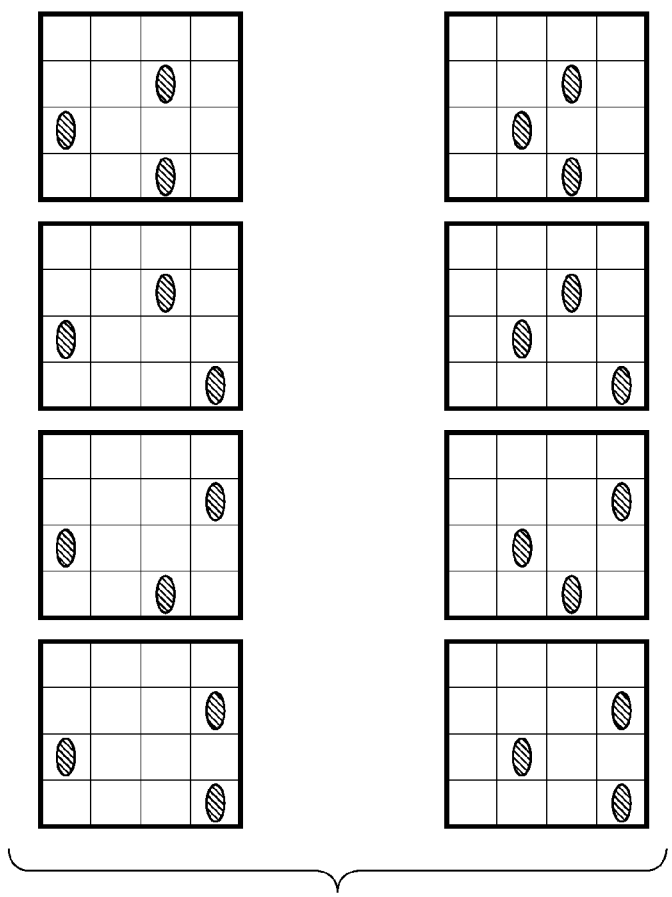

FIGS. 14A and 14B are diagrams for explaining the actual density pattern for providing the dot-on area arrangement in FIG. 13 and for explaining one of the density patterns shown in FIG. 13. FIG. 14A shows, among the density patterns in FIG. 13, the third density pattern from the top in the longitudinal direction is shown in (there are two third density patterns that have the same design). Eight density patterns shown in FIG. 14B are applied for this density pattern. That is, binary print data are generated by repetitively and sequentially employing these eight density patterns, and when the above described column thinning printing is performed based on the print data, the density pattern with the dot-on area arrangement shown in FIG. 14A is obtained, in accordance with the printing resolution.

Figure 15A:
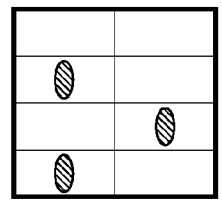
FIGS. 15A and 15B are diagrams for explaining density patterns that actually provide the dot arrangement shown in the other density pattern in FIG. 13 (i.e., the second pattern from the top)
Figure 15B:
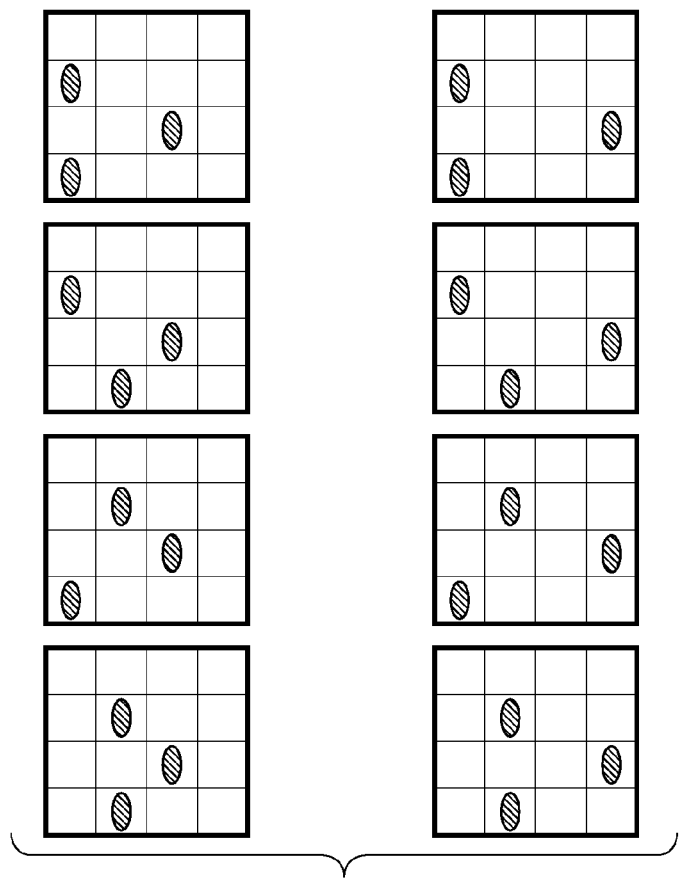

FIGS. 15A and 15B are diagrams for explaining the actual density pattern for providing the dot-on arrangement for the other density pattern (the second pattern from the top) in FIG. 13, and is similar figures as FIGS. 14A and 14B.

When the density patterns shown in FIG. 14B or 15B are employed to perform printing by column thinning, the granularity degrading can be suppressed while the resolution is increased.

Fifth Embodiment

A fifth embodiment of the present invention, as well as the fourth embodiment, relates to density patterns employed when printing is performed by column thinning in order to reduce the printing resolution for each scanning. A difference from the fourth embodiment is that nozzles are arranged in two arrays for each ink color, and the two nozzle arrays are provided at pitches of 2400 dpi in the direction in which the nozzles are arranged.

Figure 16:
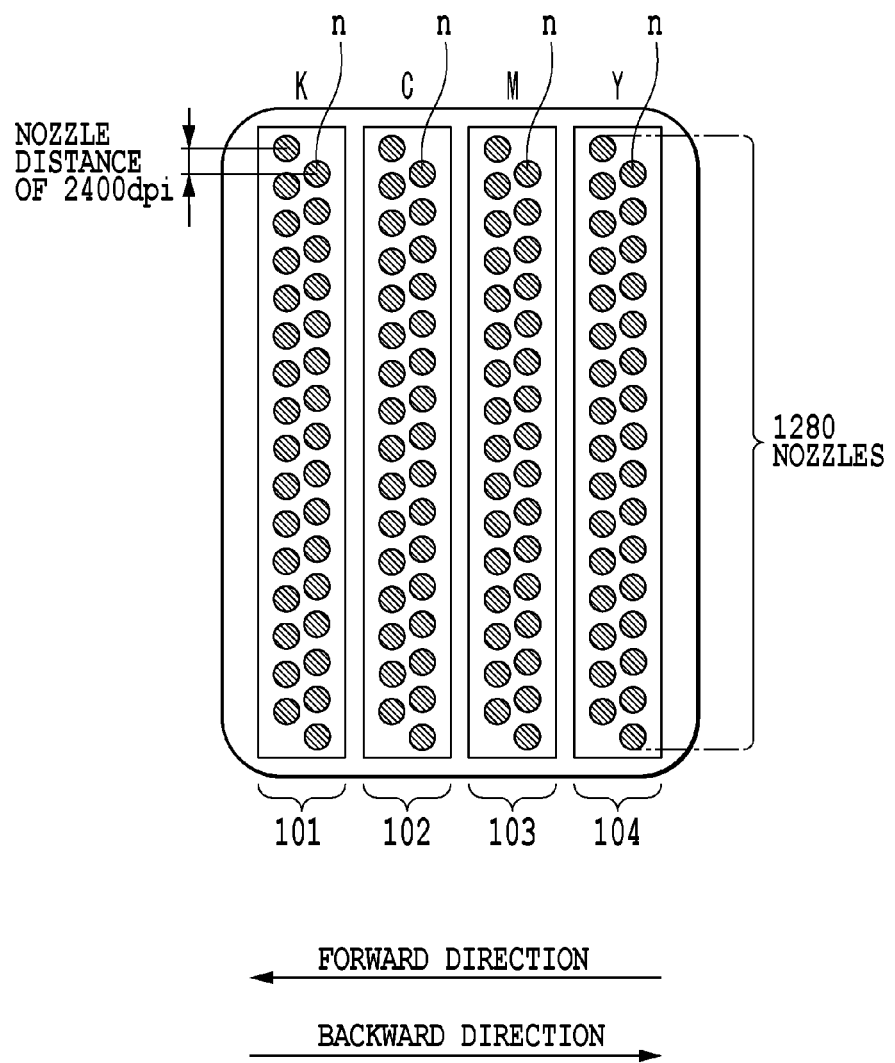
FIG. 16 is a diagram showing the nozzle arrays of print heads according to a fifth embodiment of the present invention.

FIG. 16 is a diagram showing nozzle arrays of print heads according to this embodiment. As shown in FIG. 16, two nozzle arrays are employed for each ink color, the nozzles in the individual arrays are arranged at pitches of 1200 dpi, and the individual nozzle arrays are so located that they are shifted away from each other, in the longitudinal direction, a distance corresponding to 2400 dpi. With this arrangement, the substantial nozzle resolution of 2400 dpi can be obtained by nozzle arrays having a resolution of 1200 dpi.

Figure 17A:
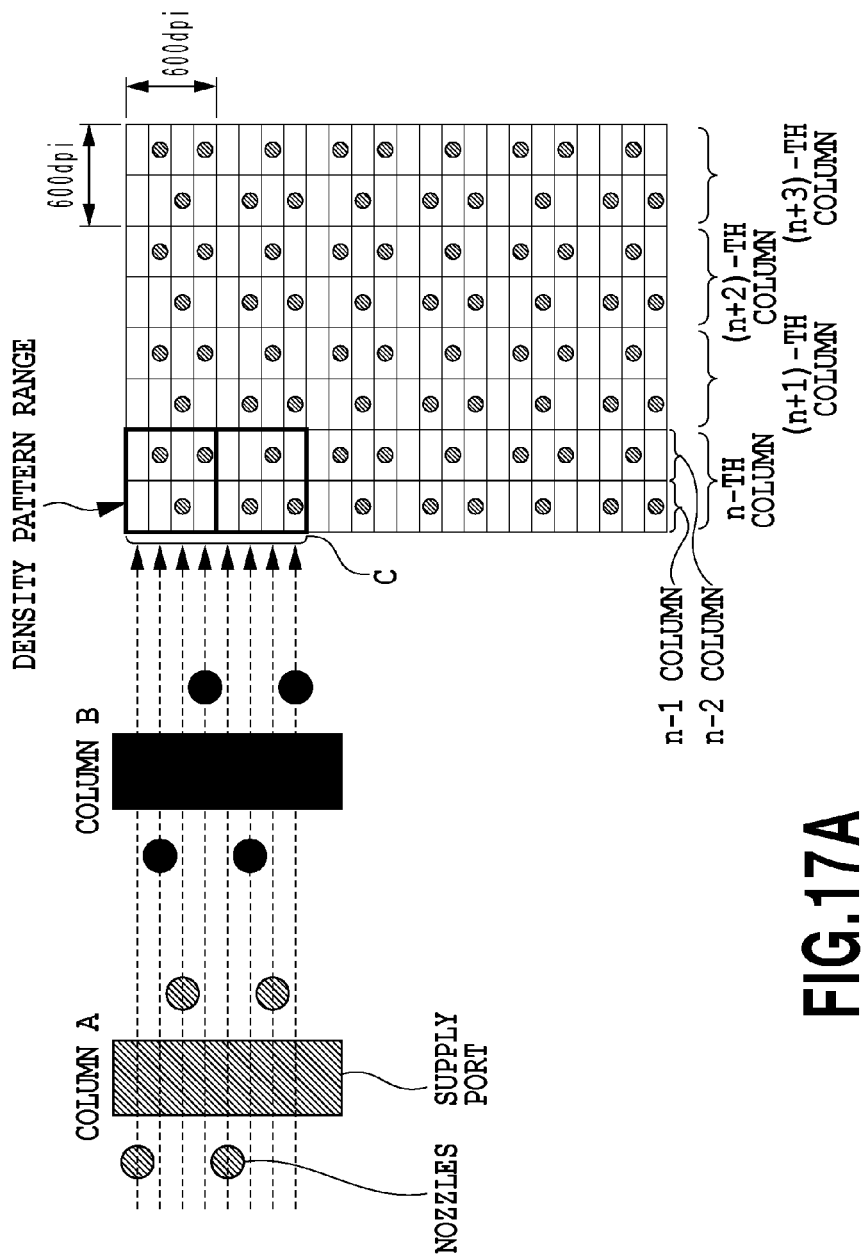
FIGS. 17A and 17B are diagrams respectively showing examples, according to the fifth embodiment, where print data are developed by repetitively employing the density patterns at level 3.
Figure 17B:
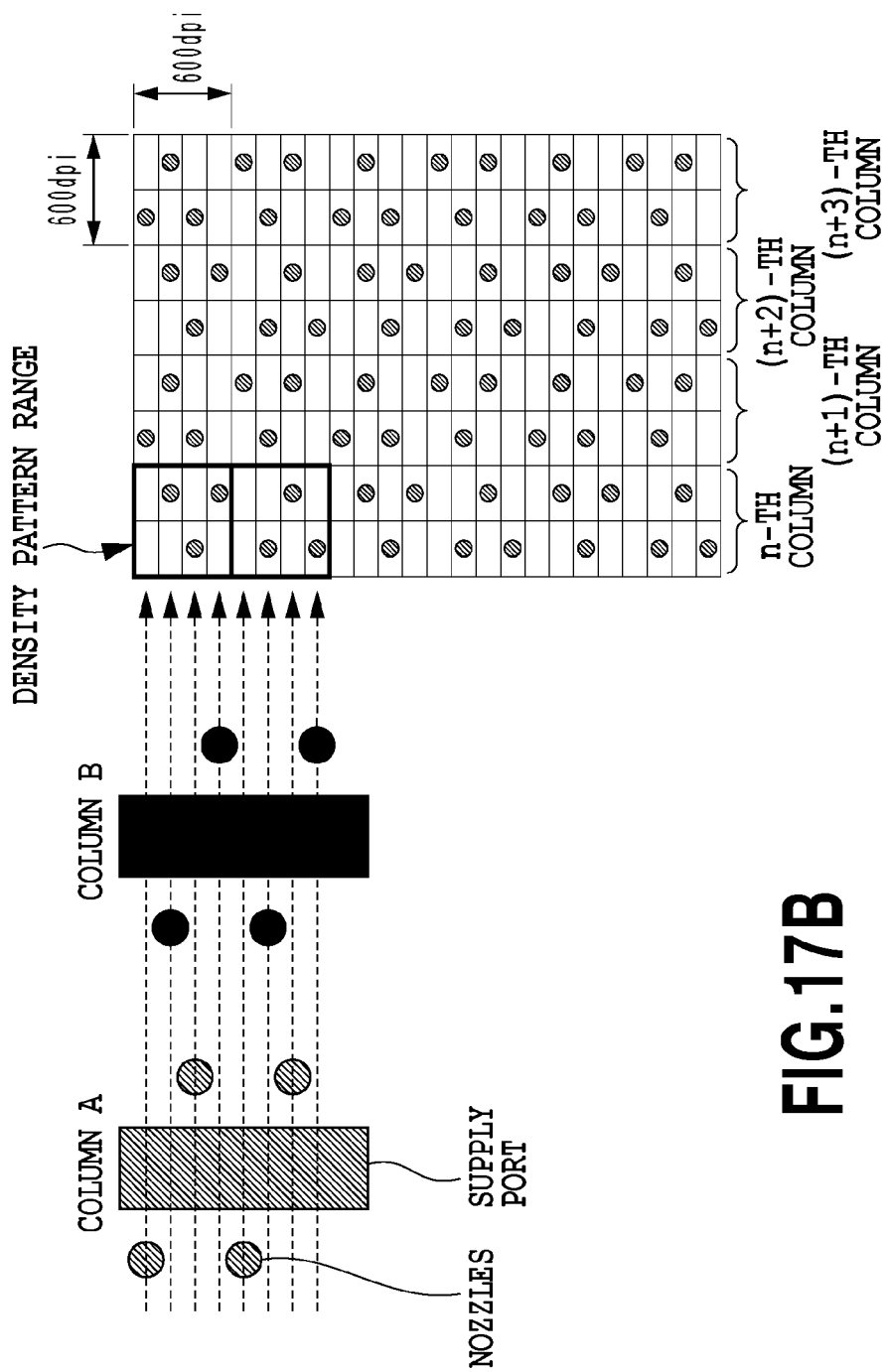
Figure 18:
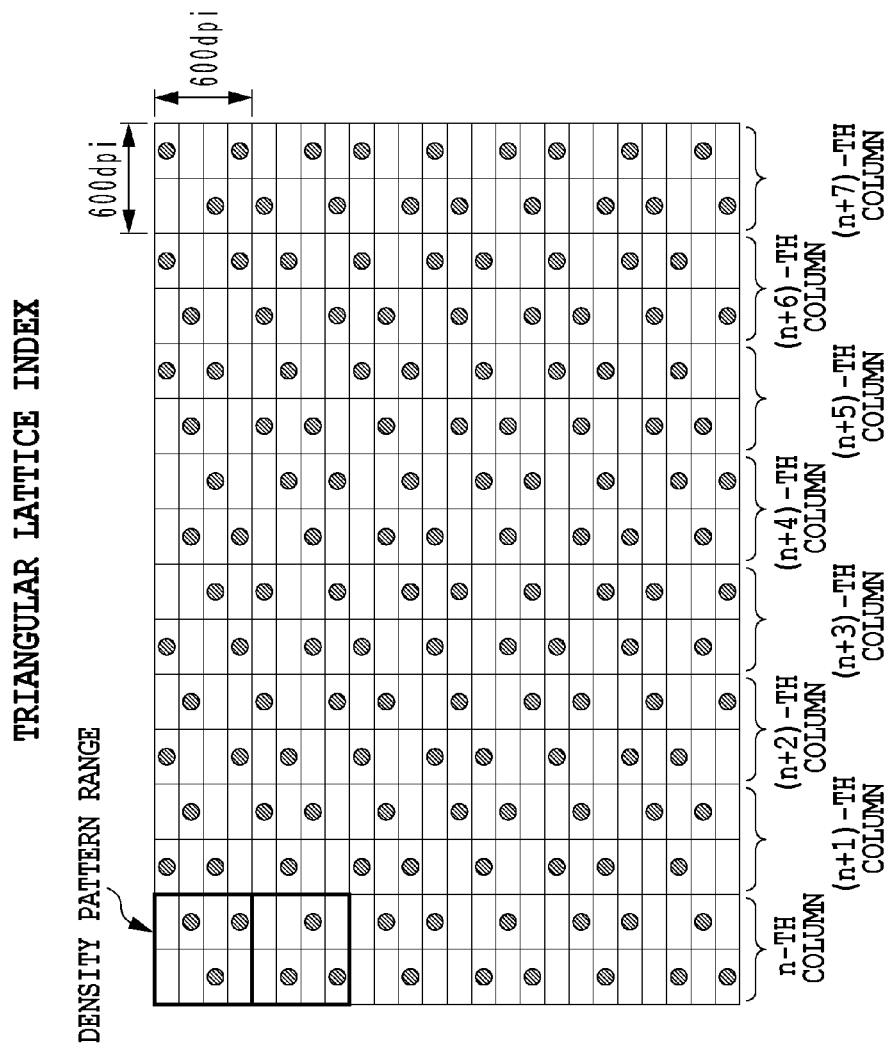
FIG. 18 is a diagram showing another example that differs from the examples shown in FIGS. 17A and 17B.

For this embodiment, the same density patterns as for the fourth embodiment are employed. For level 3, the row where no dot-on areas are allocated is at the same position in the density patterns that are longitudinally aligned. FIGS. 17A and 17B are diagrams showing two examples wherein print data are expanded by repetitively employing the density patterns for level 3, in the same manner as for the example in FIG. 13 of the fourth embodiment. In the example in FIG. 17A, the dot-on state is not entered in the areas of the first rows in the density patterns for the n-th column to the (n+3)-th column. In the example in FIG. 17B, the dot-on state is not entered in the areas of the first rows in the density patterns for the n-th column and the (n+2)-th column, and the dot-on state is not entered in the areas of the fourth rows of the density patterns for the (n+1)-th column and the (n+3)-th column. According to this example, the same pattern is repeated for every other column. FIG. 18 is a diagram showing another example. In this example, the dot-on state is not entered in the areas of the first rows of the density patterns for the n-th column and the (n+4)-th column, in the areas of the fourth rows of the density patterns for the (n+1)-th column and the (n+5)-th column, in the areas of the third rows of the density patterns for the (n+2)-th column and for the (n+6)-th column, and in the areas of the second rows of the density patterns for the (n+3)-th column and the (n+7)-th column. For this example, the same pattern is repeated for every three columns.

For the above described examples, the longitudinal repetition cycle of whitish areas matches the repetition cycle of the density patterns that are longitudinally aligned.

Sixth Embodiment

In the first to the fifth embodiments, density patterns for level 3 have been described as a case wherein the value of a density pattern level, which is an index for density patterns for which the present invention is applied, is smaller by one than the number of areas arranged in the longitudinal or transverse direction of a density pattern. For the other levels, density patterns for each level can be determined in the manner described, for example, in Japanese Patent Laid-Open No. H09-046522 (1997). However, when the present invention is applied for levels other than the level that is smaller by one than the number of areas in the longitudinal direction or in the transverse direction of the density pattern, predetermined effects can still be obtained. A sixth embodiment of the present invention relates to an example wherein the present invention is applied for density patterns for level 2 when four areas are arranged in the longitudinal direction and in the transverse direction for a density pattern.

Figure 19A:
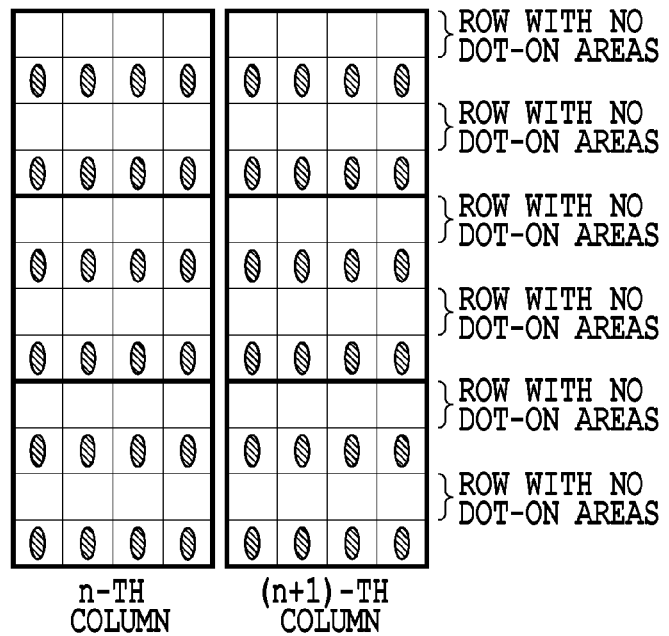
FIGS. 19A and 19B are diagrams showing dot-on position choices in the longitudinal and transverse directions of density patterns at level 2, according to a sixth embodiment of the present invention.
Figure 19B:
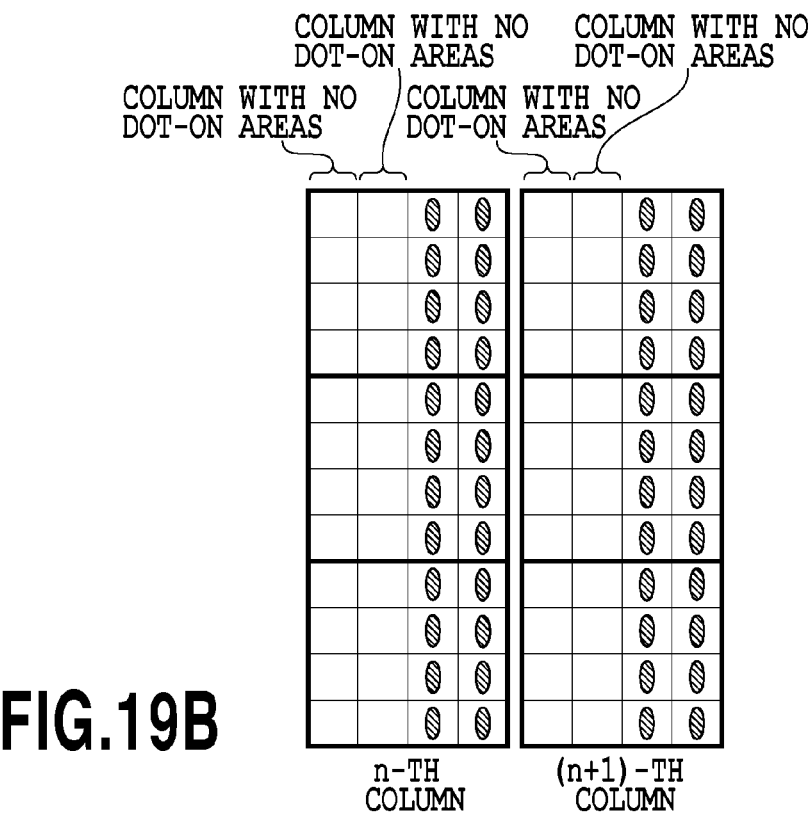

FIGS. 19A and 19B are diagrams showing dot-on arrangement choices in the longitudinal direction and in the transverse direction for density patterns for level 2, according to the sixth embodiment of the present invention.

Figure 20A:
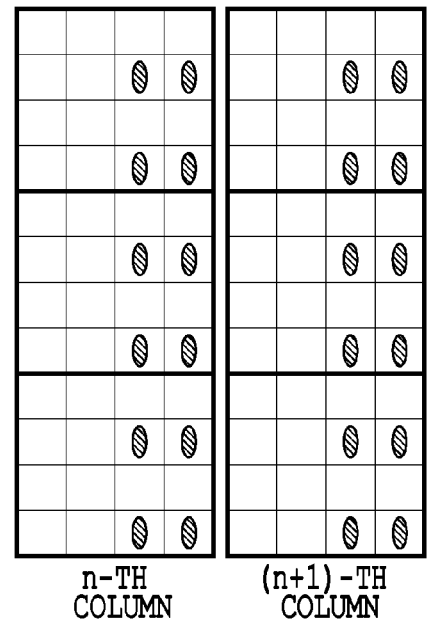
FIG. 20A is a diagram showing final dot-on position choices, provided based on the two conditions for position choices shown in FIGS. 19A and 19B.
Figure 20B:
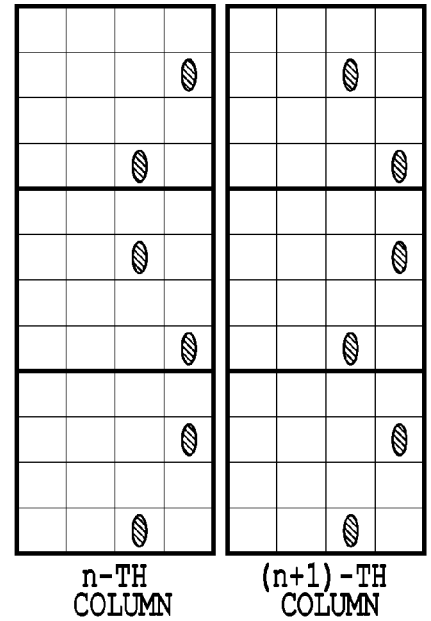
FIG. 20B is a diagram showing density patterns determined by selecting dot-on positions from among the final dot-on position choices.

When a density pattern has four areas in the longitudinal direction, for level 2, there are at least two rows where dot-on areas are not present. In FIG. 19A, the first row and the third row from the top are those in which dot-on areas are not present. In this embodiment, the same setting is performed along the columns. That is, as shown in FIG. 19B, for density patterns aligned in the transverse direction, position choices are determined so that for the first and the second columns, no dot-on areas are present. FIG. 20A is a diagram showing the final area choices obtained from the two area choice conditions shown in FIGS. 19A and 19B. FIG. 20B is a diagram showing density patterns that are determined by selecting dot-on areas in the final choices.

In this embodiment, as described above, two rows and two columns are determined wherein no dot-on areas are arranged, and density patterns are prepared by selecting the areas located in the other rows and columns.

As described above, according to the individual embodiments of the present invention, density patterns are employed in order to determine the arrangement of binary print data, for the printing of ink dots in a pixel array consisting of a predetermined number of rows and a predetermined number of columns. These density patterns are prepared for individual levels, indicated by multi-valued quantized data, and are employed to convert multi-valued data into binary print data. At this time, there may be a case wherein a value indicated by the multi-valued data is at least smaller by one than the predetermined number of rows or the predetermined number of columns in the pixel array. In this case, when a plurality of density patterns are employed so that they are aligned in the direction along the pixel rows in the pixel array, binary print data that indicates a dot is to be printed are not entered in the pixel rows at the same position as the density patterns that are aligned. Or, when these density patterns are employed so that they are aligned in the direction along the pixel columns of the pixel array, binary print data that indicates a dot is to be printed is not entered in the pixel columns at the same position as the density patterns that are aligned.

The present invention can be applied for a mode for employing a density pattern consisting of two or more areas, at least, either in the longitudinal direction or in the horizontal direction, and for repetitively employing a plurality of such density patterns in a direction in which two or more areas are present. The present invention is especially effective for a mode for employing density patterns having at least three or more areas, either in the longitudinal direction or in the horizontal direction, because noticeable granularity degrading, due to the uneven distribution of whitish areas, is avoided.

The present invention can be applied for all types of apparatuses, such as the above described ink jet printing apparatus, that perform printing on print medium. For example, the present invention can be applied not only for a serial scan type inkjet printing apparatus, illustrated as an example for the above embodiments, but also a line printer that employs a print head that is as wide as, or wider than a printing medium, or another type of ink jet printing apparatus that relatively moves a print head and a print medium in predetermined directions to perform image printing. Further, other specific apparatuses for which the present invention is applied can be office equipment, such as a printer, a copier and a facsimile machine, and industrial production equipment.

Seventh Embodiment

In the fifth embodiment described above, respective nozzles (printing elements) of two nozzle arrays A and B may be used with uneven use frequencies as shown in FIGS. 17A and 17B.

There is a limit to the number of dots printed by individual nozzle (printing element) from a standpoint of a durability of the nozzle. Further, print density varies according to the number of times which individual nozzle ejects ink to form dots. From the above, it is desirable that nozzles (printing elements) are used at even frequency to the extent possible.

The seventh embodiment of the present invention has a characterized feature that a nozzle used for printing is switched between two arrays (printing element arrays). Preferably, the above switching is performed when a print page changes or a print job changes.

To eight raster of n-th density pattern column designated by sign C in FIG. 17A, six dots are printed. Out of six dots, one dot is printed by a nozzle of the nozzle array A and two dots are printed by a nozzle of the nozzle array B in n−1 column of the n-th density pattern column, and one dot is printed by a nozzle of the nozzle array A and two dots are printed by a nozzle of the nozzle array B in n−2 column of the n-th density pattern column. In this case, it is desirable that use nozzle ratios are controlled to be changed between the nozzle arrays A and B.

Specifically, a method for the above switching may be a method in which print data that has been already obtained for the nozzle arrays A and B by means of binarization are exchanged between the nozzle arrays A and B to be supplied to each nozzle (printing element), a method in which after the above exchange, use nozzles are shifted in increments of nozzle in at least one of two nozzle arrays, or a method in which a start nozzle for use from level 1 is switched between the nozzle arrays and print data generation by means of binarization for the nozzle arrays A and B is restarted from the beginning.

This embodiment is explained in a case where two nozzle arrays (printing element arrays) are employed for one ink color. However, also in the case that three or more nozzle arrays are employed for one ink color, the method in which a nozzle used for printing is switched between two arrays (printing element arrays) holds good.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-023254, filed Feb. 4, 2011, which is hereby incorporated by reference herein in its entirety.

What is claimed is:

1. A print data generation apparatus that generates binary print data used for printing dots to each of a plurality of pixel areas on a print medium by performing scanning by a print head for printing dots in a predetermined direction relative to the print medium, said apparatus comprising:
    an obtaining unit configured to obtain multi-valued data of an image to be formed on the plurality of pixel areas; and
    a converting unit configured to convert each of the multi-valued data for the plurality of pixel areas obtained by said obtaining unit into the binary print data for defining an area, on which the dot is to be printed, in areas included in each of the plurality of pixel areas, such that in a case where a level of the multi-valued data corresponding to each of a plurality of pixel areas successive in a direction intersecting the predetermined direction is a level of the multi-valued data that determines the number of dots, which is smaller by one than the number of areas in the intersecting direction, to be printed on the pixel areas, for each of the plurality of pixel areas successive in the intersecting direction which are located at same positions in the predetermined direction, among rows of the areas which are located at different positions in the intersecting direction from each other, the dot is not printed on the area included in a predetermined one row and the dot is printed on the area included in a row different from the predetermined one row, and positions of the predetermined one rows in the respective pixel areas are the same as each other in the intersecting direction and the dots printed on the areas included in the respective different rows of the plurality of pixel areas successive in the intersecting direction are differently arranged from each other.

2. The print data generation apparatus according to claim 1, further comprising a storage unit configured to store a density pattern that defines printing or non-printing of the dot for each of the areas in the pixel area according to the level of the multi-valued data,
    wherein said converting unit converts each of the multi-valued data, based on the level of the multi-valued data and the density pattern.

3. The print data generation apparatus according to claim 1, wherein the pixel area includes three or more areas in the predetermined direction, and
    said converting unit converts each of the multi-valued data, so that among the rows which are located at different positions in the intersecting direction from each other, the dot is not printed on the area included in the predetermined one row and the dot is printed on the area included in each of the rows different from the predetermined one row.

4. The print data generation apparatus according to claim 1, wherein the respective numbers of the areas in the predetermined direction and the intersecting direction are the same as each other.

5. The print data generation apparatus according to claim 1, wherein the respective numbers of the areas in the predetermined direction and the intersecting direction are different from each other.

6. The print data generation apparatus according to claim 1, wherein in a case where the levels of the multi-valued data corresponding to the plurality of pixel areas successive in the intersecting direction are the same between the respective plurality of pixel areas which are adjacent to each other in the predetermined direction, said converting unit converts each of the multi-valued data, so that, for a group of the plurality of pixel areas which are located at different positions in the predetermined direction from each other, the predetermined one rows in the respective pixel areas are located at the same positions as each other in the intersecting direction.

7. The print data generation apparatus according to claim 1, wherein in a case where the levels of the multi-valued data corresponding to the plurality of pixel areas successive in the intersecting direction are the same between the respective plurality of pixel areas which are adjacent to each other in the predetermined direction, said converting unit converts each of the multi-valued data, so that, for a group of the plurality of pixel areas which are located at different positions in the predetermined direction from each other, the predetermined one rows in the respective pixel areas are located at different positions from each other in the intersecting direction.

8. The print data generation apparatus according to claim 1, wherein in a case where the level of the multi-valued data corresponding to each of the plurality of pixel areas successive in the predetermined direction is a level of the multi-valued data that determines the number of dots, which is smaller by one than the number of areas in the intersecting direction, to be printed on the pixel areas, said converting unit converts each of the multi-valued data, so that for each of the plurality of pixel areas successive in the predetermined direction which are located at the same positions in the intersecting direction, among rows of the areas which are located at different positions in the predetermined direction from each other, the dot is not printed on the area included in a predetermined one row and the dot is printed on the area included in a row different from the predetermined one row and positions of the predetermined one rows in the respective pixel areas are the same as each other in the predetermined direction.

9. The print data generation apparatus according to claim 1, further comprising the print head and a scanning unit configured to perform relative scans between the print head and print medium, wherein a plurality of printing elements for printing the dot, which the print head includes, are arranged in the intersecting direction.

10. A print data generation method of generating binary print data used for printing dots to each of a plurality of pixel areas on a print medium by performing scanning by a print head for printing dots in a predetermined direction relative to the print medium, said method comprising:
    an obtaining step of obtaining multi-valued data of an image to be formed on the plurality of pixel areas; and
    a converting step of converting each of the multi-valued data for the plurality of pixel areas obtained by said obtaining step into the binary print data for defining an area, on which the dot is to be printed, in areas included in each of the plurality of pixel areas, such that in a case where a level of the multi-valued data corresponding to each of a plurality of pixel areas successive in a direction intersecting the predetermined direction is a level of the multi-valued data that determines the number of dots, which is smaller by one than the number of areas in the intersecting direction, to be printed on the pixel areas, for each of the plurality of pixel areas successive in the intersecting direction which are located at same positions in the predetermined direction, among rows of the areas which are located at different positions in the intersecting direction from each other, the dot is not printed on the area included in a predetermined one row and the dot is printed on the area included in a row different from the predetermined one row, and positions of the predetermined one rows in the respective pixel areas are same as each other in the intersecting direction and the dots printed on the areas included in the respective different rows of the plurality of pixel areas successive in the intersecting direction are differently arranged from each other.

11. A print data generation apparatus that generates binary print data used for printing dots to each of a plurality of pixel areas on a print medium by performing scanning by a print head for printing dots in a predetermined direction relative to the print medium, said apparatus comprising:

an obtaining unit configured to obtain multi-valued data of an image to be formed on the plurality of pixel areas;

a converting unit configured to convert each of the multi-valued data for the plurality of pixel areas obtained by said obtaining unit into the binary print data for defining an area, on which the dot is to be printed, in areas included in each of the plurality of pixel areas, such that in a case where a level of the multi-valued data corresponding to each of a plurality of pixel areas successive in the predetermined direction is a level of the multi-valued data that determines the number of dots, which is smaller by one than the number of areas in a direction intersecting the predetermined direction, to be printed on the pixel areas, for each of the plurality of pixel areas successive in the predetermined direction which are located at the same positions in the intersecting direction, among rows of the areas which are located at different positions in the predetermined direction from each other, the dot is not printed on the area included in a predetermined one row and the dot is printed on the area included in a row different from the predetermined one row, and positions of the predetermined one rows in the respective pixel areas are the same as each other in the predetermined direction and the dots printed on the areas included in the respective different rows of the plurality of pixel areas successive in the predetermined direction are differently arranged from each other.

12. The print data generation apparatus according to claim 11, further comprising the print head and a scanning unit configured to perform relative scans between the print head and print medium, wherein a plurality of printing elements for printing the dot, which the print head includes, are arranged in the intersecting direction.

13. A print data generation method of generating binary print data used for printing dotsto each of a plurality of pixel areas on a print medium by performing scanning by a print head for printing dots in a predetermined direction relative to the print medium, said method comprising:

an obtaining step of obtaining multi-valued data of an image to be formed on the plurality of pixel areas; and a converting step of converting each of the multi-valued data for the plurality of pixel areas obtained by said obtaining step into the binary print data for defining an area, on which the dot is to be printed, in areas included in each of the plurality of pixel areas, such that in a case where a level of the multi-valued data corresponding to each of a plurality of pixel areas successive in the predetermined direction is a level of the multi-valued data that determines the number of dots, which is smaller by one than the number of areas in a direction intersecting the predetermined direction, to be printed on the pixel areas, for each of the plurality of pixel areas successive in the predetermined direction which are located at the same positions in the intersecting direction, among rows of the areas which are located at different positions in the predetermined direction from each other, the dot is not printed on the area included in a predetermined one row and the dot is printed on the area included in a row different from the predetermined one row, and positions of the predetermined one rows in the respective pixel areas are the same as each other in the predetermined direction and the dots printed on the areas included in the respective different rows of the plurality of pixel areas successive in the predetermined direction are differently arranged from each other.

* * * * *